United States Patent
Petela et al.

(10) Patent No.: US 6,747,107 B2
(45) Date of Patent: Jun. 8, 2004

(54) METHOD OF DISPERSION OF A NON-NEWTONIAN FLUID

(75) Inventors: Grazyna Petela, Calgary (CA); Karel Cornelis Bleijenberg, Breda (NL); Jonathan O'Blenes, Calgary (CA); John Thomas Bressler, Beaver Falls, PA (US)

(73) Assignee: Nova Chemical Inc., Moon Township, PA (US)

(*) Notice: Subject to any disclaimer, the term of this patent is extended or adjusted under 35 U.S.C. 154(b) by 0 days.

(21) Appl. No.: 10/222,392

(22) Filed: Aug. 16, 2002

(65) Prior Publication Data

US 2004/0034180 A1 Feb. 19, 2004

(51) Int. Cl.[7] .................................................. C08F 2/18
(52) U.S. Cl. ......................... 526/201; 526/88; 422/131; 422/134; 422/135
(58) Field of Search ................... 526/201, 88; 422/131, 422/134, 135

(56) References Cited

U.S. PATENT DOCUMENTS

| | | | |
|---|---|---|---|
| 3,922,255 A | 11/1975 | Koestler et al. | |
| 4,427,794 A | 1/1984 | Lange et al. | |
| 4,444,961 A | 4/1984 | Timm | |
| 4,487,898 A | * 12/1984 | Kato et al. | 526/65 |
| 4,623,706 A | 11/1986 | Timm et al. | |
| 4,666,673 A | 5/1987 | Timm | |
| 4,781,983 A | 11/1988 | Stickley | |
| 5,061,741 A | * 10/1991 | Miyata et al. | 523/319 |
| 6,080,796 A | 6/2000 | Liebert et al. | |
| 6,160,027 A | 12/2000 | Crevecoeur et al. | |
| 6,170,017 B1 | 1/2001 | Dias et al. | |
| 6,176,439 B1 | 1/2001 | Masison | |
| 6,320,006 B1 | * 11/2001 | Murata et al. | 526/201 |

FOREIGN PATENT DOCUMENTS

GB 1409285 10/1975

OTHER PUBLICATIONS

Disclosed Anonymously, A Device for Improving the Preparation of Uniform Size Droplets, The International Journal, Jun. 1994 No. 362.

* cited by examiner

*Primary Examiner*—David Wu
*Assistant Examiner*—Satya Sastri
(74) *Attorney, Agent, or Firm*—Kenneth H. Johnson

(57) ABSTRACT

Non-Newtonian fluids, such as partially polymerized monomers or solutions of polymer in monomer may be pressure atomized below the surface of an immiscible continuous liquid phase to produce a dispersed phase having a uniform particle size distribution. A dual or customized size distribution can be obtained by imposing a controlled pressure pulsation on a flowing fluid upstream the atomizer inlet. Such dispersion may be further polymerized to produce a uniform or customized bead size product.

27 Claims, 11 Drawing Sheets

METHOD OF DISPERSION OF A NON-NEWTONIAN FLUID

FIELD OF THE INVENTION

The present invention relates to the application of atomization technology. More particularly the present invention relates to pressure atomizing a fluid, typically a liquid in order to form a dispersed phase within another liquid which forms a continuous phase. The liquid being atomized is non-Newtonian and immiscible in the continuous phase. In one preferred embodiment the fluid being atomized is subjected to pressure pulsation and is a partially polymerized mixture of one or more monomers.

BACKGROUND OF THE INVENTION

It has been proposed to atomize and coat monomer droplets in an aqueous medium to form a suspension (Review article E. Vivaldo-Lilma et al., *An updated review on suspension polymerization. Ind. Eng. Chem.*, (36) (1997) of S. Matsumoto et al., *A production process for uniform-size polymer particles. J of Chem. Eng. Of Japan, vol. 22, No. 6* 1989). It was proposed to use coaxial nozzles and inject the monomer mixture through the inner nozzle and the coating composition through the outer nozzle. The shell of the resulting coated particle is hardened chemically or physically to form a capsule which may be suspended in water and polymerized. Subsequent to polymerization the outer shell is removed from the polymer. The present invention has eliminated an essential feature of the art, as it does not contemplate the formation of a shell about the monomers.

Comparable encapsulation technology is disclosed in U.S. Pat. No. 4,427,794 issued Jan. 24, 1984 assigned to Bayer A. G. Rather than using coaxial nozzles, the patent teaches an encapsulation medium separate from the continuous aqueous phase. As noted above the present invention has eliminated the essential feature of encapsulation required by this reference.

U.S. Pat. No. 5,061,741 issued Oct. 29, 1991, assigned to Mitsubishi Kasei Corporation discloses a method for preparing oil in water type dispersions. The oil is a monomer or monomer mixture which is not polymerized (i.e. a Newtonian liquid to be atomized). The reference fails to teach or suggest the atomization of a non-Newtonian liquid as required by the present invention. Further the reference fails to teach the application of elevated pressure to the oil (monomer) phase. Additionally, the reference teaches the monomer and continuous phase are at relatively low temperatures not exceeding about 30° C. A critical feature of the reference is the use of a disperser plate having nozzles in an annular design. The patent teaches away from the present invention in that a disperser plate having an annular layout for the nozzles is not required. The atomizing nozzles may be uniformly distributed over the disperser or orifice plate.

U.S. Pat. No. 3,922,255 issued Nov. 25, 1975 assigned to Rohm and Haas Company teaches atomizing unpolymerized monomers into a continuous water phase. The monomers are not polymerized and therefor are not non-Newtonian. Further the reference fails to teach applying a pressure pulsation to monomer feed to the atomizers. The reference fails to teach the subject matter of the present invention.

There are a series of patents in the name of Timm, assigned to the Dow Chemicals Company which teach dispersing monomer droplets in a continuous phase by subjecting a jet of a monomer mixture to vibratory excitement. This art includes U.S. Pat. Nos. 4,444,961; 4,666,673; and 4,623,706. The references fail to teach atomization of a non-Newtonian liquid. Further the references fail to teach the application of high pressure to the phase to be atomized. Further the flow rates of the Timms references appear to be up to an order of magnitude lower than the flow rates of the present invention.

The present invention seeks to provide a process to pressure atomize non-Newtonian immiscible liquids into a continuous liquid medium.

SUMMARY OF THE INVENTION

The present invention provides a process comprising pressure atomizing a non-Newtonian immiscible liquid at a gauge pressure of at least 3 bar, preferably the pressure is subjected to pulsation with a controlled frequency and amplitude, in an amount from 0.01 to 60% volume of a continuous liquid phase, below the free surface of the continuous liquid phase which may be stationary or flowing, contained in a tank, pipe or loop vessel, to produce a dispersion of atomized droplets of the immiscible liquid having at least one controlled average diameter from 0.1 mm to 5 mm.

In a preferred embodiment the droplets are maintained under shear and turbulence conditions insufficient to cause agglomeration or secondary breakup of the atomized droplets.

DETAILED DESCRIPTION

Figure 1:
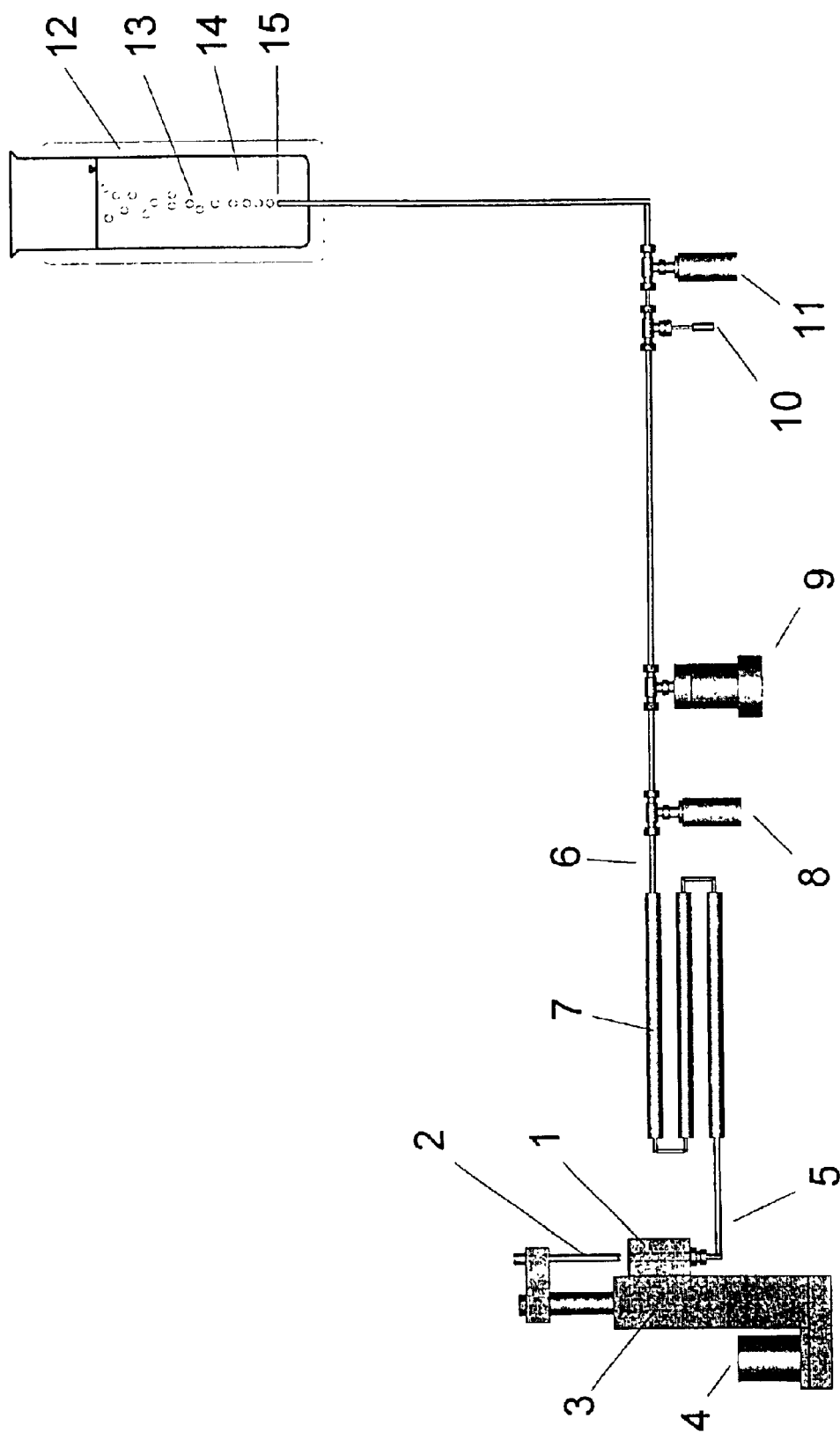
FIG. 1 is a schematic diagram of the experimental setup used to conduct the experiments.
Figure 2:
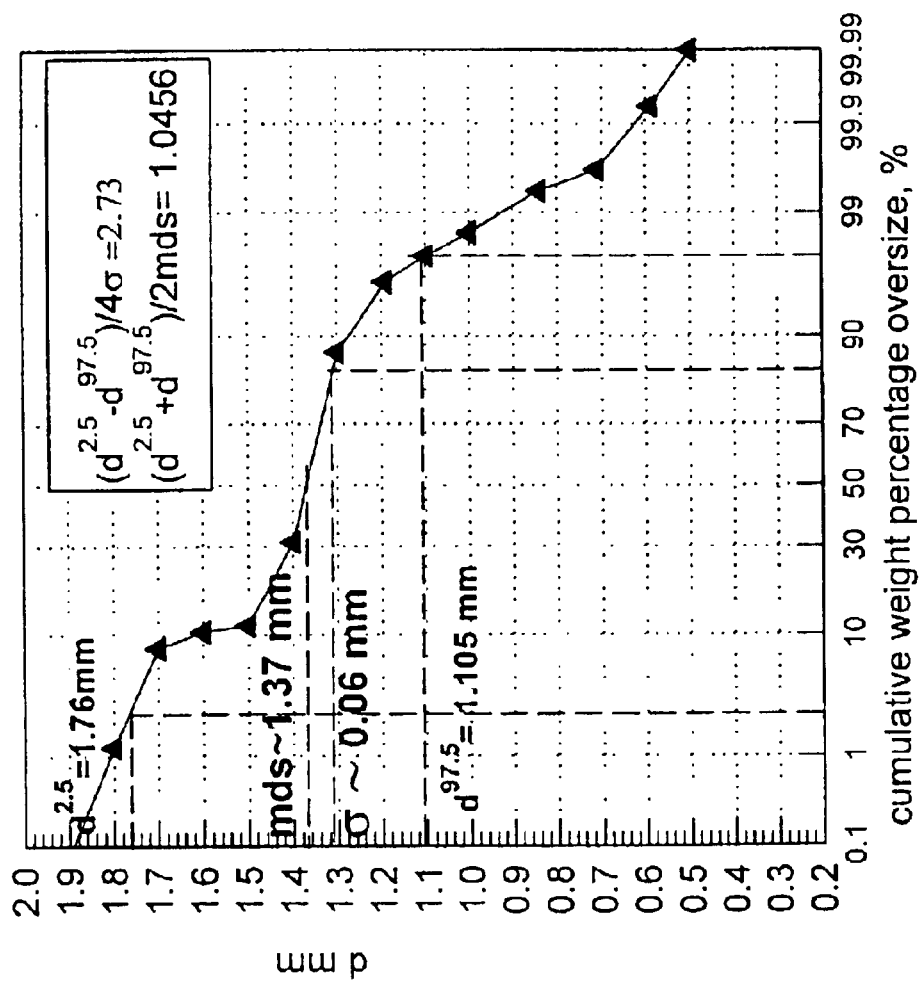
FIGS. 2, 3, 4, 5, 6 and 7 are graphs of the size of the droplets in mm against the cumulative weight % of oversized droplets for different atomization conditions for 10% prepolymerized styrene monomer atomized into water solution with different types of suspending agents.
Figure 3:
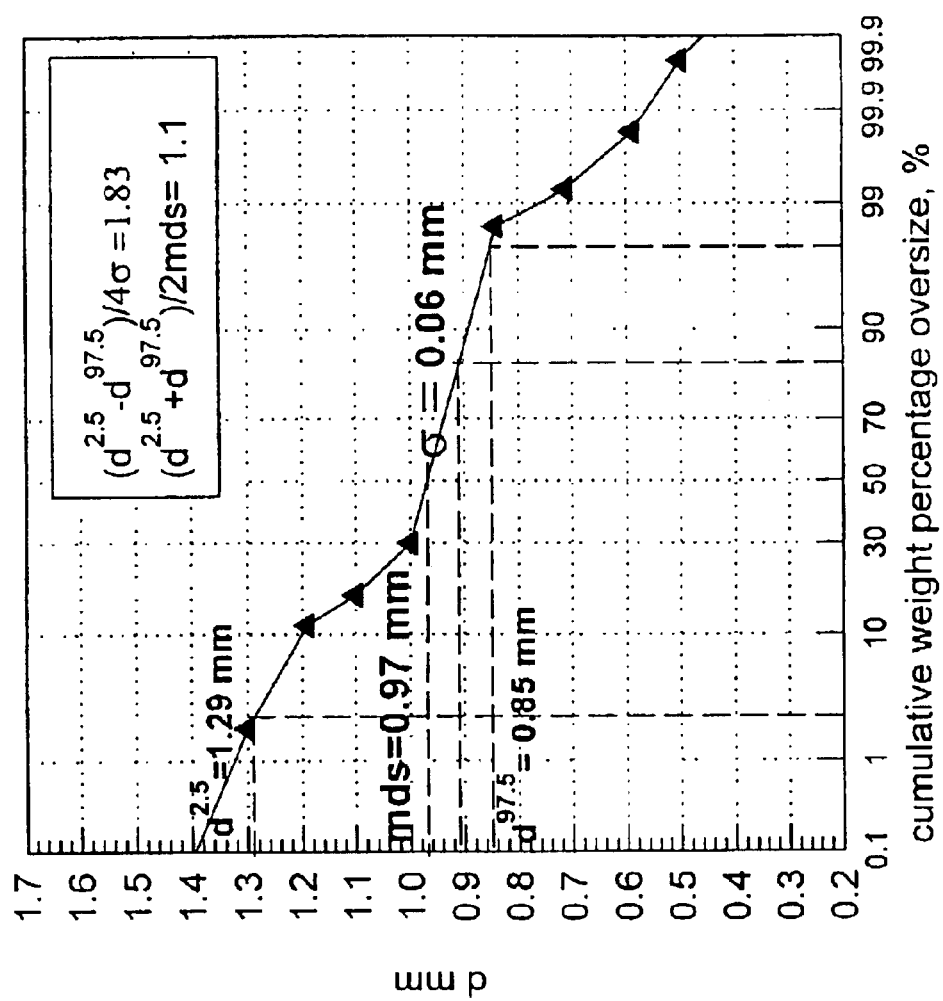
Figure 4:
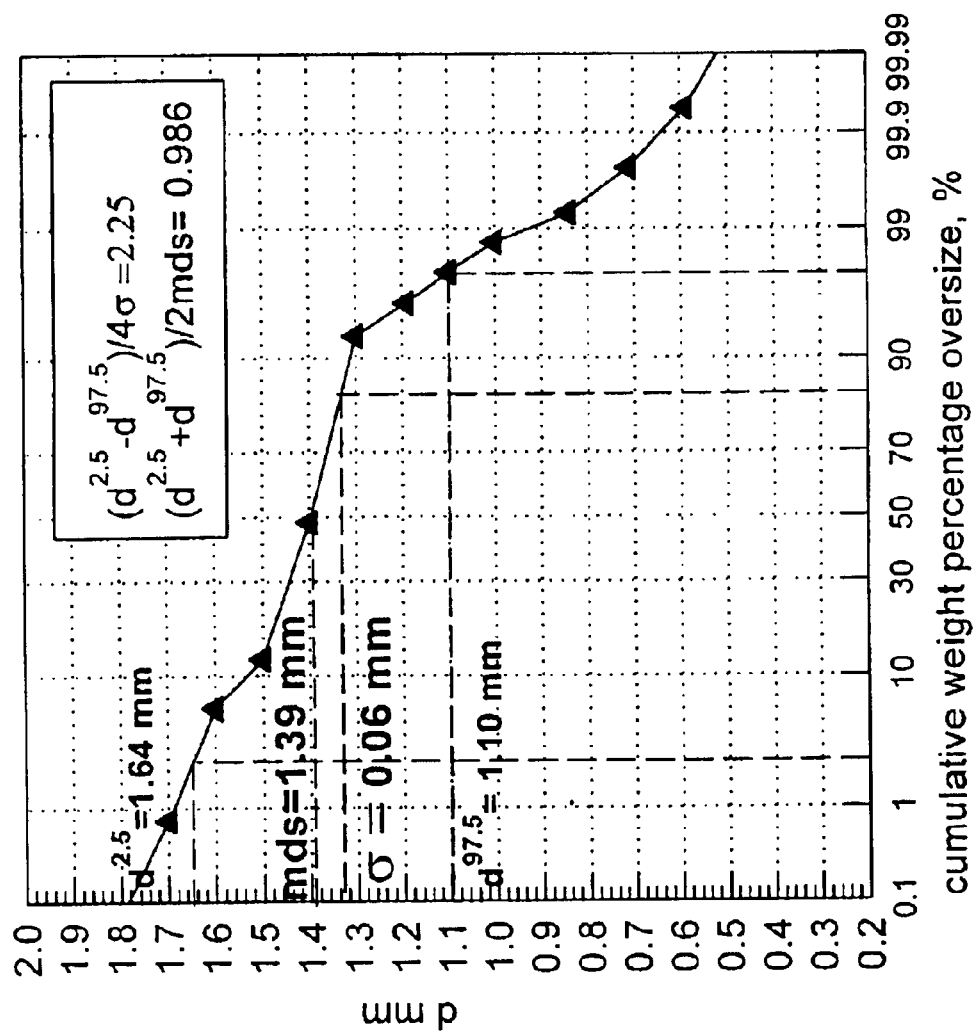
Figure 5:
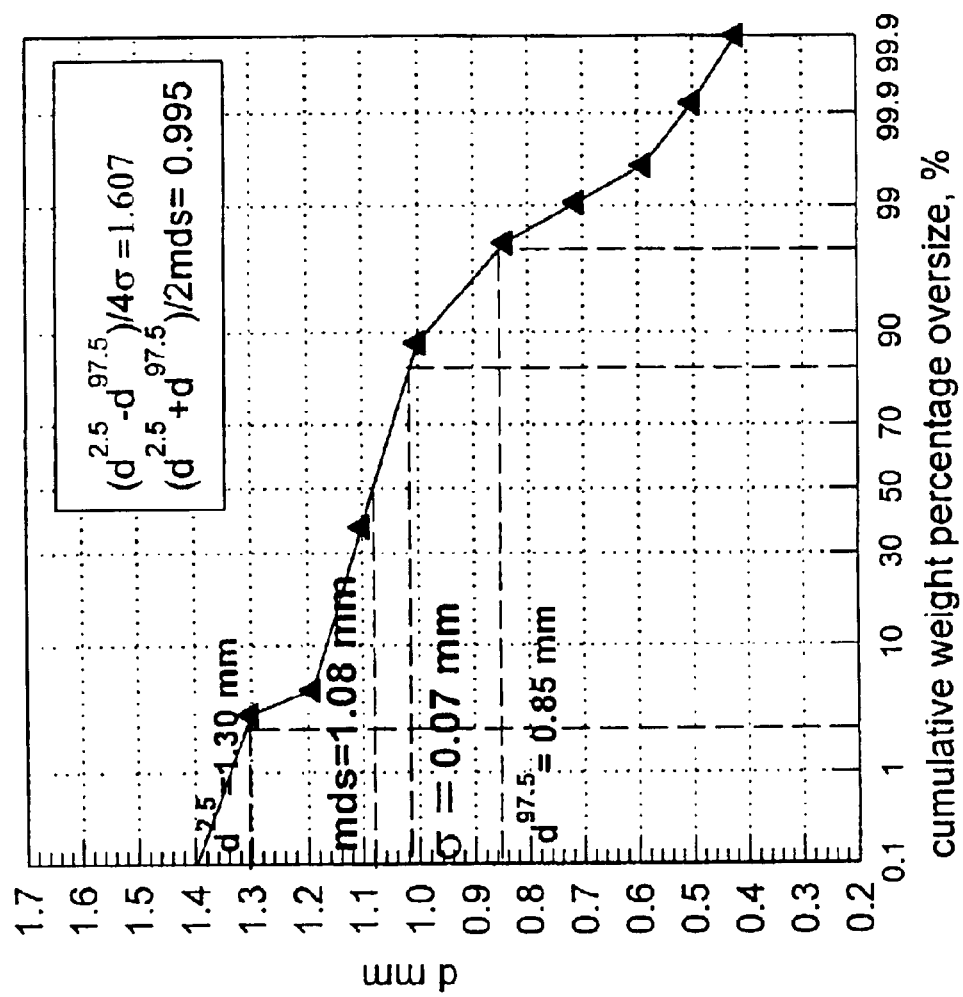
Figure 6:
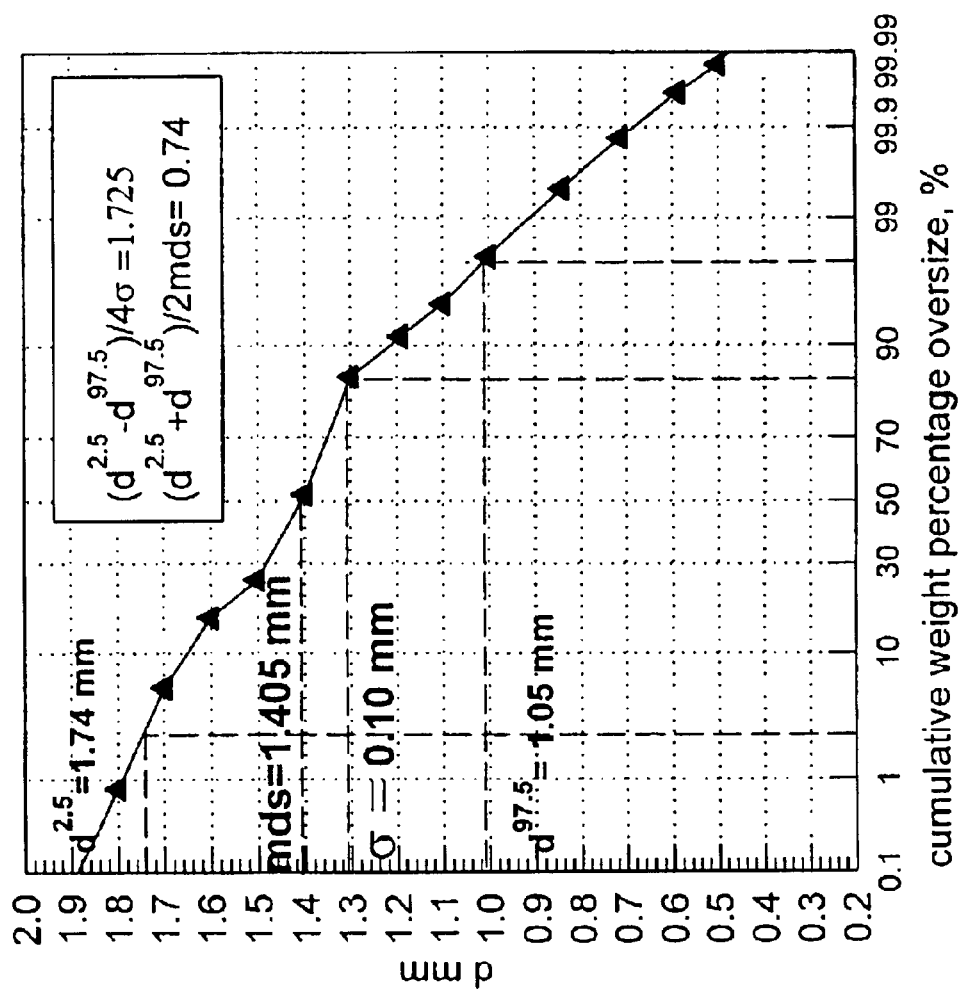

As used in this specification, particles may be solid or liquid and droplets are liquid.

As used in this specification "non-Newtonian" means a liquid which does not have a linear relationship between shear stress and fluid strain rate. Generally non-Newtonian liquids exhibit shear thinning (pseudoplastic) or shear thickening (dilatent). All gases, water (salt and fresh) and most unpolymerized hydrocarbons are Newtonian liquids.

As used herein "visco-elastic liquid" means a liquid which has conjoint viscous and elastic properties. Typically these materials tend to be more viscous than water and if deformed under shear will tend to return to their pre-shear condition if the shear is removed. Typically these liquids are partially polymerized monomers listed below, typically polymerized at least to 5%, generally from 5 to 45%, preferably from 10 to 40% conversion of monomers or solutions of polymers in the monomers listed below having dissolved therein typically not less than 5 weight %, generally from 5 to 45 weight %, preferably from 10 to 40 weight % of the polymer. Typically the polymer will be a co- or homopolymer of the monomers listed below. However other polymers may be used, such as polyolefins (e.g. polyethylene), polycarbonates (polyphenylene oxides) and impact (rubber modified) forms of such polymers such as high impact polystyrene (HIPS). The impact modified polymers typically contain as a dispersed phase from about 2 to 30, weight % of one or more rubbers selected from the group consisting of:

(a) co- or homopolymers of $C_{4-6}$ conjugated diolefins (i.e. diene rubbers);

(b) random, block, and tapered copolymers comprising from 30 to 70, preferably from 40 to 60, weight % of one or more $C_{8-12}$ vinyl aromatic monomers which are unsubstituted or substituted by a $C_{1-4}$ alkyl radical; and from 70 to 30, preferably from 60 to 40 weight % of one or more $C_{.4-6}$ conjugated diolefins (e.g. styrene butadiene rubbers or SBR); and (c) copolymers comprising from 5 to 50 weight % of acrylonitrile or methacrylonitrile and from 50 to 95 weight % of one or more $C_{4-6}$ conjugated diolefins (e.g. nitrile rubbers).

The immiscible fluids useful in accordance with the present invention are non-Newtonian fluids, preferably non-Newtonian liquids.

The non-Newtonian liquids used in accordance with the present invention may also be visco elastic liquids.

The monomers or mixture of monomers suitable for use in the present invention include any monomer or monomers which can be emulsion or suspension polymerized. Typically the one or more monomers may be selected from the group consisting of $C_{8-12}$ vinyl aromatic monomers which are unsubstituted or substituted by up to two substituents selected from the group consisting of $C_{1-4}$ alkyl radicals; acrylonitrile; methacrylonitrile; maleic anhydride; malimide; and $C_{1-4}$ alkyl esters of $C_{1-6}$ monocarboxylic acids.

Suitable vinyl aromatic monomers include styrene, alpha methyl styrene and para methyl styrene. Suitable alkyl esters of $C_{1-6}$ monocarboxylic acids include methyl methacrylate, ethyl methacrylate, butyl acrylate, methyl acrylate, ethyl acrylate and butyl acrylate.

Preferably the monomer is styrene which has been polymerized up to 45% conversion, typically from 10 to 45% conversion.

The immiscible liquid may be a solution of one or more of the above monomers containing one or more polymers. Typically the polymers will be co- or homo-polymers of the above listed monomers. However the polymers may also include rubber modified polymers of the above monomers such as HIPS and acrylonitrile butadiene styrene (ABS) polymers and butyl acrylate (homopolymer) modified poly acrylates such as poly methyl methacrylate or styrene acrylates such as polymers comprising from about 5 to 50 weight % of methyl methacrylate and from about 50 to 95 weight % of a vinyl aromatic monomer as described above. The polymer may be a polyolefin such as polyethylene or copolymers of ethylene and up to about 20 weight % of a $C_{4-8}$ mono, preferably alpha, olefin such as butene, hexene and octene or a copolymer of ethylene and up to about 40 weight % of an ethylenically unsaturated carboxylic acid such as a copolymer of ethylene and acrylic acid. Such solutions of polymers in monomers are also non-Newtonian visco elastic immiscible liquids.

Generally the liquid to be atomized will have a viscosity between 0.1 and 4000 centipoise (cP) preferably between 100 and 2500 cP, most preferably between 100 and 2000 cP.

The fluid to be atomized and the continuous phase fluid (suspending liquid or medium) are immiscible.

Typically the continuous phase may also contain a stabilizing amount of a suspending agent.

The suspension medium is preferably selected to enhance the production of the uniform droplets of the immiscible liquid. Preferably the viscosity of the continuous phase may be up to about 150 cP. Particle formation and movement of the droplets through the suspension medium may be easier and more effective when the viscosity of the continuous phase is the same order of magnitude or less than the viscosity of the dispersed liquid. Due to the balance of buoyancy, drag and gravity forces, larger droplets of partially polymerized monomer or polymer in monomer solution move more readily through the suspension medium than do smaller monomer droplets. The average size of the atomized droplets is determined by the atomizer geometry, monomer exit velocity from the atomizer and properties of both continuous and atomized phases. A higher viscosity suspending medium may be employed in the preparation of larger droplets of atomized liquid. Generally, the suspension medium (e.g. the continuous phase) has a viscosity in the range from 0.01 to 400 cP. The viscosity of the continuous phase may be from about 0.01 to about 1, preferably from about 0.05 to about 0.5 times the viscosity of the atomized liquid. The viscosity of the atomized liquid may range from about 1 to 4000 cP and the viscosity of the continuous phase may range from 0.1 to 400 cP, typically up to 150 cP, most preferably about 1 to 100 cP. The atomized liquid which is non-Newtonian (e.g. partially pre polymerized monomer or a solution of polymer in monomer) may have a viscosity from about 10 to 4000 cP, preferably from 100 to 2000 cP.

In addition, the suspension medium may have a sufficiently different density from that of the atomized liquid to allow the droplets to rise through the continuous phase. Preferably the density of the suspending medium is greater than or equal to the density of the droplets of the atomized liquid, with the density of the suspension medium typically being from about 1.02, to about 1.5, times the density of the droplets of atomized liquid. If the atomized liquid (e.g. the dispersed phase) is further polymerized, the density of the droplets or particles of the dispersed phase may change and typically increase. Alternatively, if the droplets of the atomized liquid were to descend through the suspension medium, the density of the suspension medium may be from about 0.98 to about 0.90 times the density of the droplets of atomized liquid.

The continuous phase is suitably any inert liquid, which is immiscible with the partially polymerized monomer or polymer in monomer solution. The term "immiscible" meaning less than about 1 weight percent of the partially polymerized monomer or polymer in monomer solution is miscible (or soluble) in the suspending liquid (i.e. the continuous phase does not solvate more than about 1 weight percent of the partially polymerized monomer or polymer in monomer solution). Preferably less than about 0.1 weight percent of the partially polymerized monomer or polymer in monomer solution is miscible in the suspending liquid.

Typically, the continuous phase (suspending liquid or suspension liquid) is water. However, mixtures of water with one or more water-miscible organic liquids such as the lower alkyl alcohols such as methanol or butanol may be used. The addition of organic liquids, which are immiscible with the dispersed phase and may or may not be immiscible with the continuous phase, and salts may be used to vary (increase) the density of the continuous phase. Preferably, water is employed as the continuous phase.

Generally in the practice of this invention, the continuous phase (suspending liquid or medium) will contain a surfactant or suspending aid. However it is also possible to add the suspending aid to the liquid to be atomized. Suitable suspending aids are those materials which enable the formation of the monomer phase into spheroidal droplets of a desired size and which hinder the coalescence or secondary dispersion (breakage) of the thus-formed droplets.

Suspension stabilizers are well known in the art and comprise organic stabilizers, such as poly(vinyl alcohol), preferably hydrolyzed at least 70%, typically up to 95%, preferably at no more than 98% and having a weight average molecular weight from about 30,000 to 300,000, typically from 75,000 to 300,000; carboxymethy cellulose typically having a weight average molecular weight up to 500,000; gelatine; agar; polyvinyl pyrrolidine; polyacrylamide; inorganic stabilizers, such as alumina, bentonite, magnesium silicate; surfactants, such as sodium dodecyl benzene sulfonate; or phosphates, like tricalciumphosphate, disodium-hydrogen phosphate, optionally in combination with any of the stabilizing compounds mentioned earlier. In some cases the stabilizer's effectiveness may be enhanced by using an extender. One skilled in the art may readily determine the usefulness of any particular stabilizer or combination of stabilizers and/or extenders. The amount of stabilizer may suitably vary from 0 up to 10 weight %, usually 0.01 to 10, preferably 0.1 to 8, most preferably 0.1 to 5% by weight, based on the weight of the continuous phase and depending on the viscosity of liquid to be atomized (e.g. higher viscosity liquids require more stabilizer). If the suspending aid or stabilizer is added to the liquid to be atomized, it may be added in an amount to provide the same amount of stabilizer.

The suspension stabilizer should be capable of forming a surface between the continuous phase and the dispersed liquid having an interfacial tension of not less than 3, preferably not less than 8, most preferably greater than or equal to 12 dynes/cm.

The pressure atomizers used in accordance with the present invention typically are circular orifices and have diameters from 0.01 to 2, preferably from 0.1 to 1, desirable from 0.1 to 0.5, most desirable from 0.1 to 0.4 mm and a length less than about 5 mm. Generally, the atomizer will have a length to diameter (L/D) ratio ranging from about 0.2 to about 10, preferably from 0.2 to 5.

For industrial application the liquid to be atomized may be injected into the continuous phase using an atomizer or a header plate containing atomizers (e.g., a plate having a number of holes of the above dimensions therein). The number of atomizers which may be accommodated in a header plate will depend on the size of the plate and the size and spacing of the atomizers. A header plate may contain multiple atomizers provided they do not interfere with each other. Care should be taken to minimize the interaction between atomized streams, particularly in the vicinity of the atomizer exits. There is a need to space the individual atomizers sufficiently far apart to minimize the interaction between adjacent streams from adjacent atomizers. Excessive interactions between adjacent streams may cause deformation of the atomized droplets due to their direct collisions or may lead to premature dispersion of the streams (e.g. the continuous stream of liquid to be atomized) into droplets. The interactions between adjacent streams of liquid to be atomized do not appear to be significant when adjacent streams are separated by a distance of at least 5, preferably 10 times the average diameter of the atomized droplets.

The atomizers may be equally spaced in a square or other pattern over the entire surface of the header plate.

In order to reduce viscosity of the liquid to be atomized to improve quality of atomization, in one embodiment of the invention heat is applied to the liquid to be atomized at one or more locations selected from the group consisting of the storage tank for the liquid to be atomized, the transfer line from the storage tank to the atomizer, and the atomizer.

The liquid to be atomized contained in the storage tank and/or in the transfer line may be heated to a temperature from ambient (20° C.) up to below the decomposition point of the components of the liquid to be atomized (e.g. decomposition point of polymer in the liquid to be atomized). In one embodiment of the invention the temperature may be the set temperature of the process if, for example, the atomized liquid is to be polymerized up to about 135° C. The temperature may range from at least about 30° C., preferably not less than 45° C., and most desirably not less than 50° C. Generally temperatures from about 50° C. to 95° C. are useful (for atomization).

The atomizers may also be heated to similar temperatures. For example, the exit part of the atomizer comprising the orifice plate could be heated with a circulating liquid such as water or another heat transferring liquid or, preferably could be heated by other means such as electrical heaters.

The liquid to be atomized may be dispersed in the continuous phase in an amount from about 0.01 to 60 volume %, preferably from about 10 to 50 volume %, and most preferably from about 15 to 45 volume %. Additives, as discussed below may be added to the continuous phase in a total combined amount from 0.01 to 15, volume %, and preferably 0.05 to 10 volume %.

The liquid to be atomized is added to the continuous phase at a rate from 0.05 to 15, typically 0.1 to 12, and preferably 0.5 to 10 ml/sec/per atomizer.

In accordance with the present invention there may be added to either the liquid to be atomized, the continuous phase, or both, from 0 up to 10 weight %, typically from 0.1 to 10, and generally 0.05 to 8, but preferably from 0.1 to 5 weight % of the liquid to be atomized of one or more members selected from the group consisting of initiators, anti-static agents or additives, flame retardants, pigments (colorants) or dyes, fillers, stabilizers (UV and/or heat and light), coating agents, plasticizers, chain transfer agents, crosslinking agents, nucleating agents, and insecticides and or rodenticides.

Suitable initiators are organic peroxy compounds, such as peroxides, peroxy carbonates and peresters. Typical examples of these peroxy compounds are $C_{6-20}$ acyl peroxides, such as decanoyl peroxide, benzoyl peroxide, octanoyl peroxide, stearyl peroxide, peresters, such as t-butyl perbenzoate, t-butyl peracetate, t-butyl perisobutyrate, t-butylperoxy 2-ethylhexyl carbonate, carbonoperoxoic acid, (1,1-dimethylpropyl) (2-ethylhexyl) ester, hydroperoxides and dihydrocarbyl peroxides, such as those containing $C_{3-10}$ hydrocarbyl moieties, including di-isopropyl benzene hydroperoxide, di-t-butyl peroxide, dicumyl peroxide or combinations thereof.

Other initiators, different from peroxy compounds, are also possible, as for example azides such as 2,2'-azobisisobutyronitrile. The amount of initiator is suitably from 0.01 to 1.00 weight %, based on the amount of liquid to be atomized. The continuous liquid or the liquid to be atomized may also contain an anti-static additive or agent; a flame retardant; a pigment (colorant) or dye; a filler material; plasticizers, such as white oil. The continuous liquid or the liquid to be atomized may also contain coating compounds typically comprising silicones; metal or glycerol carboxylates, suitable carboxylates include glycerol mono-, di- and tri-stearate, zinc stearate, calcium stearate, and magnesium stearate; and mixtures thereof. Examples of such compositions have been disclosed in GB Patent No. 1,409, 285 and in Stickley U.S. Pat. No. 4,781,983. The coating composition can be applied to the particles via dry coating or via a slurry or solution in a readily vaporizing liquid in various types of batch and continuous mixing devices. This coating aids in preventing the particles from forming agglomerates during the pre-expansion stage, and therefore, aids in improving the quality of the molded foamed article.

The continuous liquid phase or the liquid to be atomized, or both may contain various additives such as chain transfer agents, suitable examples including $C_{2-15}$ alkyl mercaptans, such as n-dodecyl mercaptan, t-dodecyl mercaptan, t-butyl mercaptan and n-butyl mercaptan, and other agents such as pentaphenyl ethane and the dimer of α-methyl styrene. The liquid to be atomized, or the continuous phase may contain cross-linking agents, such as butadiene and divinylbenzene, and nucleating agents, such as polyolefin waxes. The polyolefin waxes, i.e., polyethylene waxes, have a weight average molecular weight of 500 to 5,000. The waxes may be used in a quantity of 0.05 to 1.0% by weight, based on the amount (weight) of the liquid to be atomized. The continuous phase or the liquid to be atomized may also contain from 0.1 to 0.5% by weight, talc, organic bromide-containing compounds, and polar agents or emulsifiers as described in e.g. WO 98/01489 (U.S. Pat. No. 6,160,017) which may comprise alkylsulphosuccinates, sorbital-$C_8$–$C_{20}$ carboxylates, and $C_8$–$C_{20}$ alkylxylene sulphonates. Nucleating agents may be incorporated in the continuous phase or the liquid to be atomized, or both and they are particularly useful because they tend to improve the formation of cells if the invention is used to form foamable polymers.

Suitable insecticides are disclosed in U.S. Pat. Nos. 6,153,307 and 6,080,796. These include boron compounds (borates and boric acid). Some useful insecticides may be selected from the group consisting of 1-[(6-chloro-3-pyridinyl)methyl]-4,5-dihydro-N-nirto-1H-imidazol-2-amine and 3-(2,2-dichloroethenyl)-2,2-dimethylcyclopropanecarboxylic acid cyano(3-phenoxyphenyl)-methyl ester (cypermethrin), the active ingredient in, for example, Demon TC sold by Zeneca; 3-(2,2-dichloroethenyl)-2,2-dimethylcyclopropanecarboxylic acid (3-phenoxyphenyl) methyl ester (permethrin), the active ingredient in, for example, Dragnet FT and Torpedo sold by Zeneca; and 1-[(6-chloro-3-pyridinyl)methyl]-4,5-dihydro-N-nirto-1H-imidazol-2-amine (imidacloprid), the active ingredient in, for example, Premise sold by Bayer.

In embodiments of invention, liquid to be atomized may contain from 0 to about 40 weight % of water to produce polymer particles having from 4 to 16% of water as taught in U.S. Pat. No. 6,176,439. Or the liquid to be atomized may contain from 1 to 20, most preferably from 3 to 15 weight % of water as taught in column 3, lines 19 0 26 of U.S. Pat. No. 6,160,027 (WO98/01489) discussed above. The texts of both U.S. Pat. No. 6,176,439. And U.S. Pat. No. 6,160,027 are herein incorporated by reference.

The liquid to be atomized is passed through the atomizer and forms a stream of liquid within the continuous phase and this stream disperses downstream of the atomizer exit as droplets in the continuous liquid phase. Typically the droplets will have an average size from about 0.1 to 5 mm, preferably from 0.3 to 3 mm, most preferably from 0.5 to about 2 mm. For relatively uniform atomized droplets the standard deviation for size distribution is typically less than about 10% (from about 0.1 to 10%, typically from 1 to 8%, preferably from 1 to 5%) of the average diameter of the droplets of atomized liquid. Typically for a droplet size from about 0.5 to 3 mm the standard deviation of the droplet size is from about 0.03 to 0.25 mm (e.g. not more than 8% of the average droplet diameter). It should be noted that the average droplet diameter is substantially larger than the diameter of the atomizer.

The liquid to be atomized is forced through the atomizer (s) under pressure. Typically the pressure is not greater than 100 bars (e.g. 3 to 100 bars), typically from 3 to 80, preferably from 5 to 60 bars. The pressure energy of the liquid to be atomized is converted in an atomizer to stream kinetic energy. This kinetic energy further leads to stream disintegration when a stream interacts with the atomizer orifice exit and with the surrounding continuous phase. This interaction generates a disturbance which breaks the stream into droplets (or particles) either at the atomizer exit or the disturbance propagates downstream within the stream and breaks the stream into droplets at some distance further from the atomizer exit. In one embodiment of the invention the pressure of the flowing liquid to be atomized is subject to continuous or intermittent pulsation upstream of the atomizer inlet of less than 10% typically from 1 to 10, preferably from 3 to 8%, of the static pressure of the atomized liquid. The frequency of the pulsation depends, among other parameters, on the viscosity of the atomized liquid and may range from 1 to 500, preferably less than 200 Hz generally less than 150 Hz. The imposed pressure pulsation strengthens and amplifies the original disturbance generated by the stream-atomizer interaction in a way that affects droplet size distribution and, usually, makes it more uniform. By adjusting frequency and amplitude of the imposed pressure pulsation, a dual size or customized distributions can be generated. In the case of atomization of more viscous Non-Newtonian liquids, pressure pulsation can be imposed as a primary mechanism/source of stream breakup (droplet formation).

Preferably, the atomization may take place directly into a reactor under the free surface of the continuous phase or it may take place into a holding tank for subsequent transfer to a reactor. The atomized droplets should be maintained under shear and turbulence conditions insufficient to cause agglomeration or secondary breakup of the atomized droplets. Care has to be taken so that the droplets will not further agglomerate or breakup. Generally the conditions should provide low, and preferably relatively uniform shear without significant turbulence. Advantageously, the continuous phase may be subjected to laminar motion. Preferably the laminar motion should be substantially through the continuous phase as opposed to a local laminar motion which a low speed impeller may generate. One system to achieve such flow is by the slow rotation perpendicular to the longitudinal axis of the polymerization vessel. Low speed augers, optionally in conjunction with baffles may achieve this type of laminar flow.

The droplets of atomized (dispersed) liquid may be further polymerized in the continuous phase. The atomized liquid droplets should be suspended in the continuous phase in a way that prevents their agglomeration or secondary break up. The droplets may be distributed within a volume of the continuous phase, flowing in a laminar slow motion. Typically the continuous liquid will be heated as discussed above to temperatures up to 135° C., typically not more than 130° C. Typically the polymerization will be to not less than 90%, preferably 95%, most preferably 99.5% or to a greater conversion.

The resulting particles may be used in a number of applications such as ion exchange resins or applications requiring a uniform or customized particle size distribution.

However, in a further embodiment of the invention the polymerization of the atomized liquid takes place in the presence of a blowing agent. The blowing agent may be incorporated in the continuous liquid phase or the liquid to be atomized. If the blowing agent is in the continuous liquid phase it may be present in amounts from 2.5 to 7 weight % based on the weight of the atomized liquid or the liquid to be atomized. If it is introduced into the liquid to be atomized it would be used in corresponding amounts.

In another embodiment the polymerization may be finished and the resulting polymer beads are obtained and subsequently impregnated with a blowing agent. The polymer beads or particles would be re-suspended in a liquid medium, such as water and the medium would additionally contain from 2.5 to 7 weight % based on the polymerized dispersed liquid (e.g. polymer beads) of a blowing agent.

Suitable organic blowing agents are well known to those skilled in the art and are typically selected from the group consisting of: acetone, methyl acetate, butane, n-pentane, hexane, isobutane, isopentane, neopentane, cyclopentane and cyclohexane and mixtures thereof. Other blowing agents used in making polymer particles expandable are HFC'S, CFC'S, and HCFC'S, and mixtures thereof. In some cases water may be used as a blowing agent for example as disclosed in EPO applications 99947397.8; 99952459.8; and 97932783.0.

Preferably, in the present invention, the blowing agent is selected from the group consisting of acetone, methyl acetate, butane, n-pentane, cyclopentane, isopentane, isobutane, neopentane, and mixtures thereof. A preferred blowing agent is normal pentane and mixtures of pentane. The foregoing blowing agents may also be used in combination with carbon dioxide, air, and nitrogen.

The present invention will now be illustrated by the following non-limiting examples.

Experimental Set Up.

The experimental set up is schematically shown in FIG. 1. The liquid to be atomized was placed in a cell or chamber 1. At the top of the cell a plunger 2 was inserted to apply static pressure to the liquid to be atomized to control the flow rate of liquid to be atomized through the atomizer 15. The plunger 2 was driven by a screw actuator 3 and a servo motor 4. The outlet 5 from the cell 1 was connected to a transfer line 6. Portions or the entire length of the transfer line 6 were jacketed 7 to apply heat to the flowing liquid. The static pressure of the liquid in the transfer line 6 was measured by a static pressure transducer 8. A pressure pulsation generator 9 was also connected to the transfer line 6 in a way that it generated pressure pulsation mechanical motion in the direction perpendicular to the flow of the to-be-atomized liquid. The resulting instantaneous pressure of the liquid to be atomized was measured by the fast response pressure transducer 11 also connected to the transfer line 6. A thermocouple 10 was in the transfer line to control the heat applied to the liquid flowing in the line. The transfer line 6 entered a jacketed reactor 14 filled with a continuous liquid phase (water with stabilizing agent) 13. The reactor was jacketed 12 so it could be heated or cooled. The transfer line delivered the liquid to be atomized to an atomizer 15. The atomizer could be changed to provide a different diameter and L/D ratio. A sample of the continuous phase containing about several thousand of atomized liquid droplets was analyzed for the particle size distribution by viewing it via camera under a 7× microscope and taking photographs of the droplets. Then the photographs were processed by a computer to determine the average particle diameter and the standard deviation of the size distribution (using commercially available software). The results were converted (using customized software) to generate the plots shown in the Figures.

At the end of each experiment the equipment was drained and cleaned for the next experiment.

EXAMPLES

Example 1

In all atomization experiments in this example, pressure pulsation from the range of 50–80 Hz was applied to the flow of liquid to be atomized, with the amplitudes not exceeding 3% of static pressure of the flowing liquid.

A series of solutions of styrene monomer polymerized to 10% conversion were prepared for dispersion by pressure atomization. Different types and amounts of stabilizer were used in the continuous phase and different flow rates of the atomized liquid and atomizer sizes were used. In the experiments the stabilizer was poly(vinyl alcohol) having a (Mw) molecular weight of at least 75,000 and hydrolyzed to less than 95% except in one case where the stabilizer was an experimental low molecular weight compound (Mw about 30,000). The continuous phase containing atomized liquid droplets was analyzed using a microscope coupled with a camera and a computer program to determine the average droplet diameter and the standard deviation of the size distribution. FIGS. 2 through 7 are plots of the droplet diameter against cumulative weight percentage oversized %. The graphs show the weight % of the droplets having a size above a given droplet diameter. MDS is the mean droplet size, and more than 50% of the particles have a size greater than the MDS ($d_{50}$). The standard deviation σ is the difference between MDS and the diameter for which 84% of the particles are larger ($d_{84}$), (σ=$d_{50}$−$d_{84}$). The conditions and results are set out in table 1.

TABLE 1

| Stabilizer Type | Stabilizer amount Wt. % | Atomizer diameter (mm) | Flow Rate Ml/s | Average particle size (mm) | Standard Deviation (mm) |
|---|---|---|---|---|---|
| PVA KX-315L[1] | 3 | 0.30 | 0.12 | 1.37 | 0.06 |
| PVA GL05 | 2.5 | 0.20 | 0.08 | 0.97 | 0.06 |
| PVA GL05 | 5 | 0.20 | 0.08 | 1.39 | 0.06 |
| PVA GM14R | 3 | 0.18 | 0.10 | 1.08 | 0.07 |
| PVA GL05 | 5 | 0.20 | 0.10 | 1.405 | 0.10 |
| PVA GL05 | 5 | 0.20* | 0.10 | 1.35 | 0.035 |

[1]Low molecular weight PVA
*Note the L/D ratio was twice that of the other atomizers.

Figure 8:
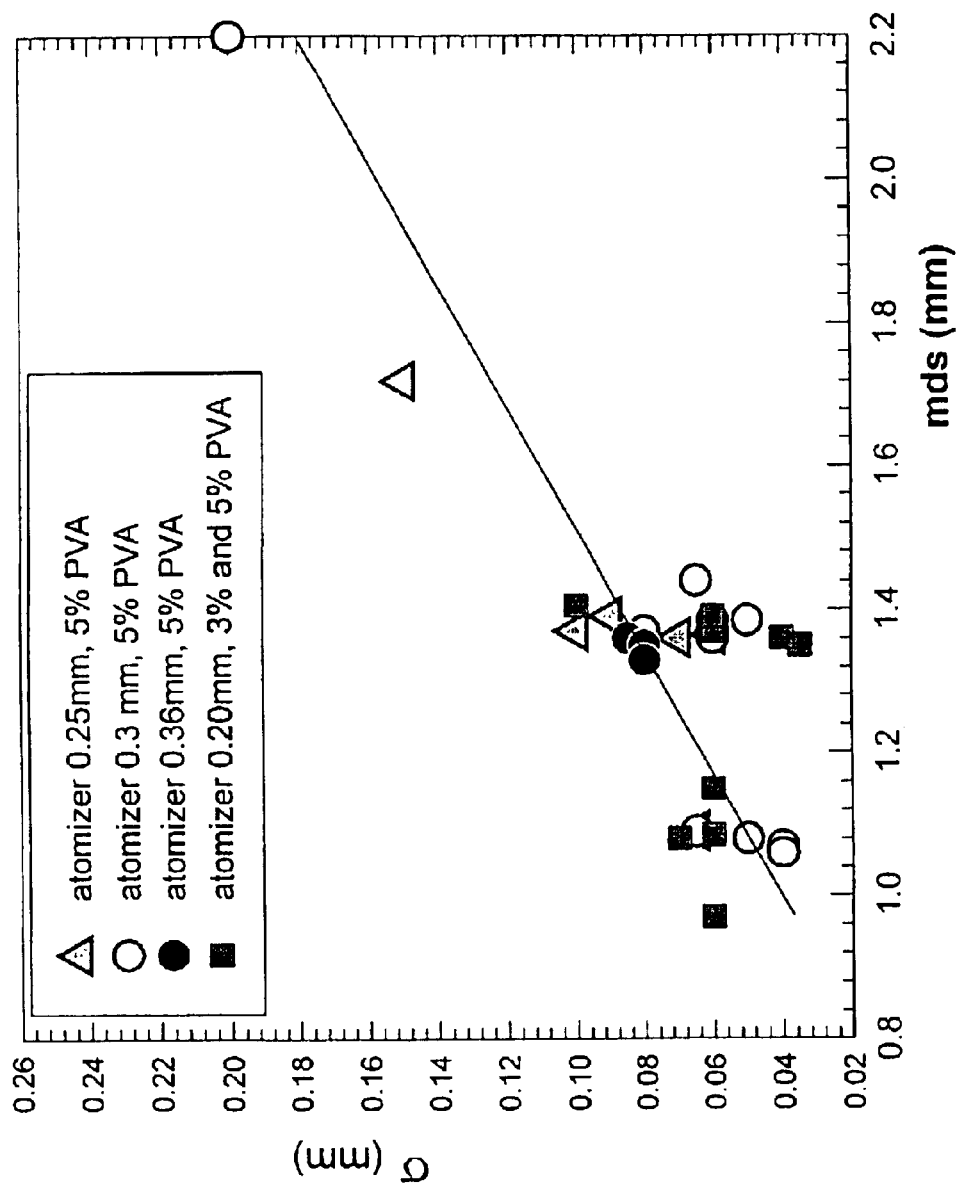
FIG. 8 is a graph of the standard deviation of the droplets against the average diameter of the droplets for additional experiments including those from which FIGS. 2 through 7 were generated.

FIG. 8 is a plot of the average droplet diameters against the corresponding standard deviations, including the data presented in table 1 and some additional experimental results. The graph shows there is a very low standard deviation for each of the average diameters of the droplets.

Figure 7:
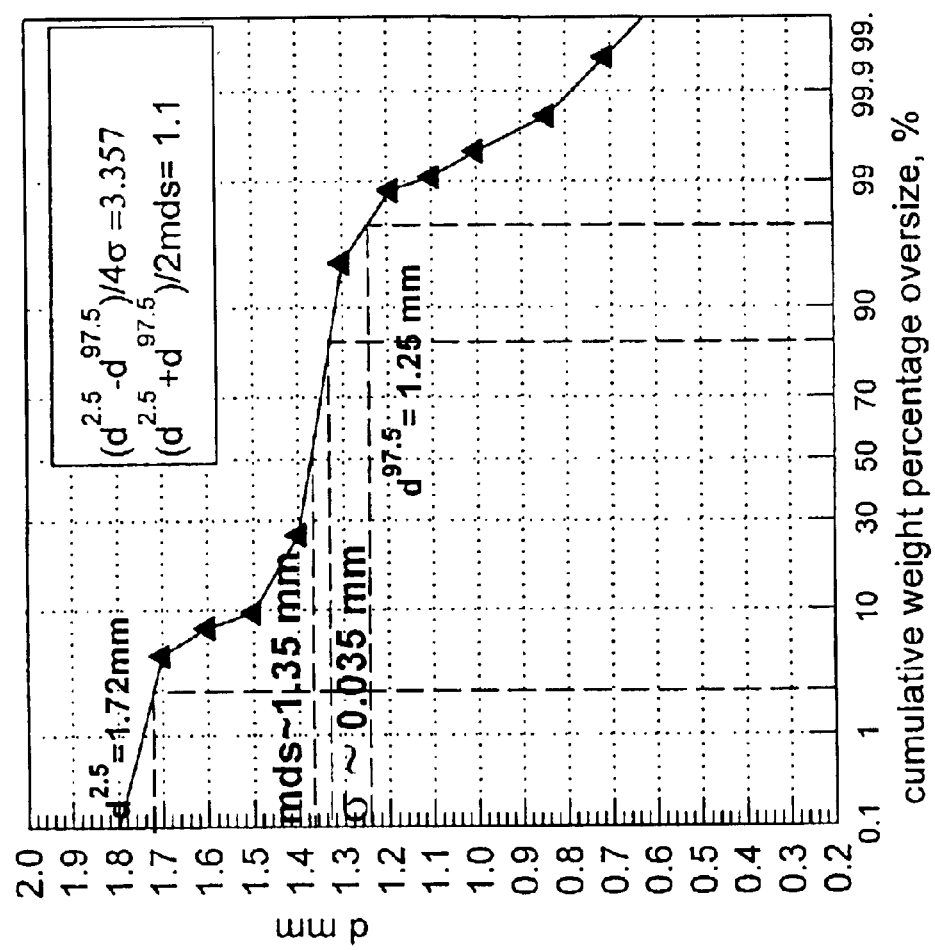
Figure 9:
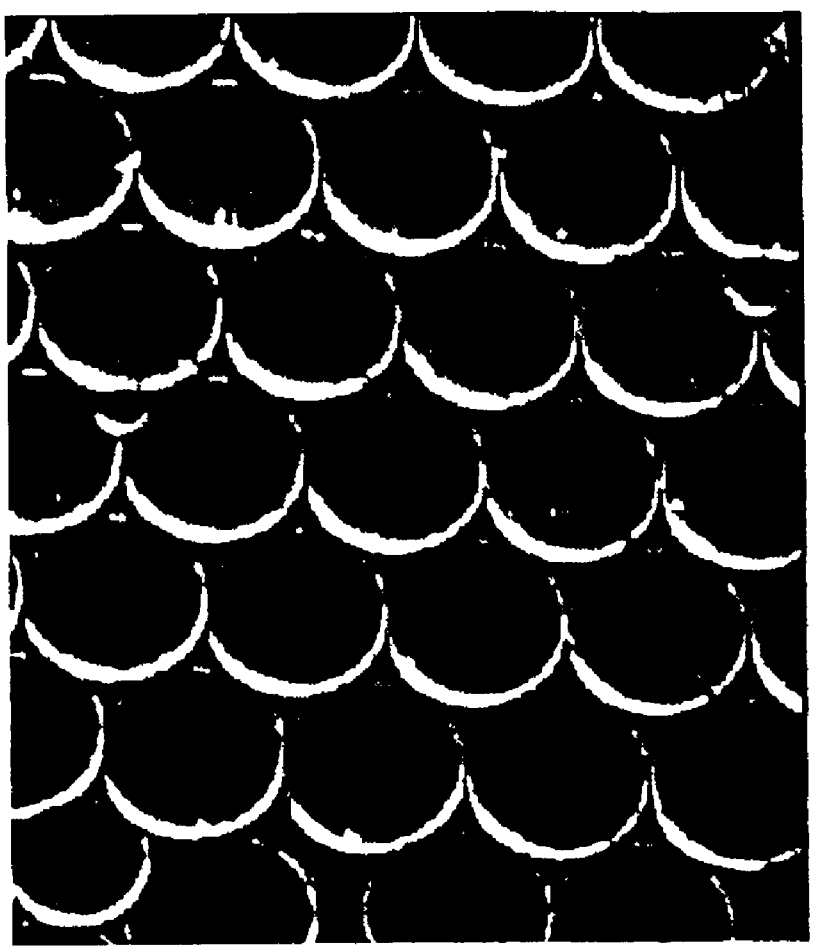
FIG. 9 is a microphotograph (through a microscope) of the atomized particles/droplets having the size distribution shown in FIG. 7.

FIG. 9 shows the atomized droplets viewed by a camera through a microscope from the last experiment listed in table 1 and having the size distribution shown in FIG. 7.

Example 2

The procedure of Example 1 was repeated except that the liquid to be atomized was styrene polymerized to 35% conversion. The liquid to be atomized was stabilized with 1.5 weight % hydrolyzed polyvinyl alcohol, GM14R. Additionally, the liquid to be atomized was heated in the transfer line to about 45° C., which reduced its viscosity to approximately 1600 cP. The flow rate was 0.35 ml/s through the atomizer and the atomizer diameter was 0.3 mm. A pressure pulsation with the amplitude of about 8% of the static pressure of the liquid to be atomized and at a frequency of 90 Hz was imposed by the pulsation generator in the transfer line atomizer on the flow of liquid to be atomized. The average droplet size was 2 mm and the standard deviation was 160 microns.

Figure 11:
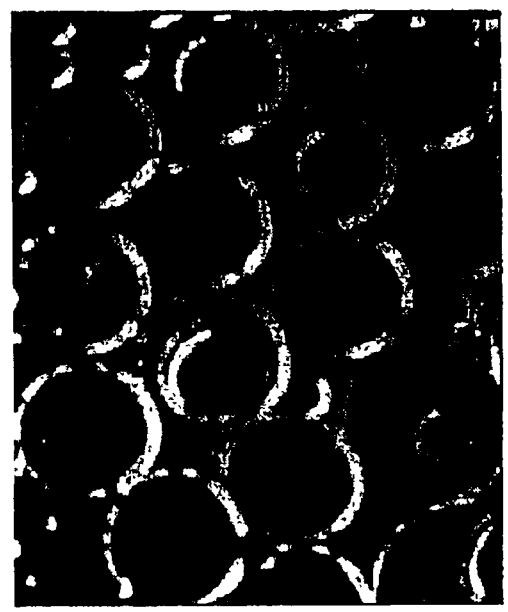
FIG. 11 shows the camera view of the atomized droplets of example 2 under a microscope (7x).
Figure 10:
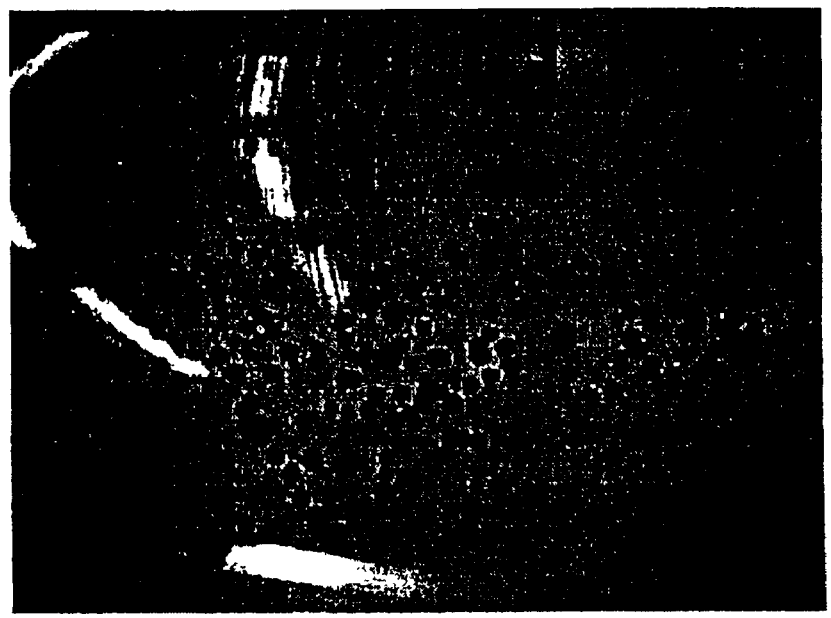
FIG. 10 shows the atomized droplets of example 2 photographed in a reactor vessel, flowing upwards towards free surface of a continuous phase.

FIG. 10 shows the atomized droplets of this example photographed in a reactor vessel, flowing upwards towards free surface of a continuous phase and FIG. 11 shows the camera view of the droplets under the microscope

Example 3

Example 2 was repeated except that the partially polymerized to 35% styrene was not heated in the transfer line and it had viscosity of about 1800 cP; the imposed pressure pulsation was at a frequency of 100 Hz; the stabilizer was used in a amount of 3 weight % and the flow rate through the atomizer was 0.75 ml/s. The average size of the atomized droplets was 4 mm and the standard deviation was 90 microns.

Figure 13:
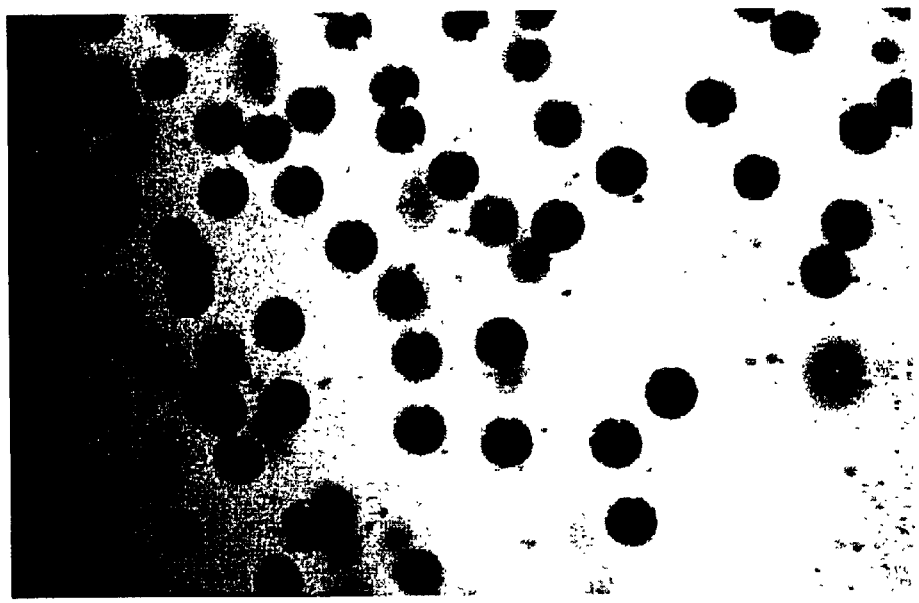
FIG. 13 shows the enlarged (7x) droplets of example 3 photographed in the reactor close to the free surface.
Figure 12:
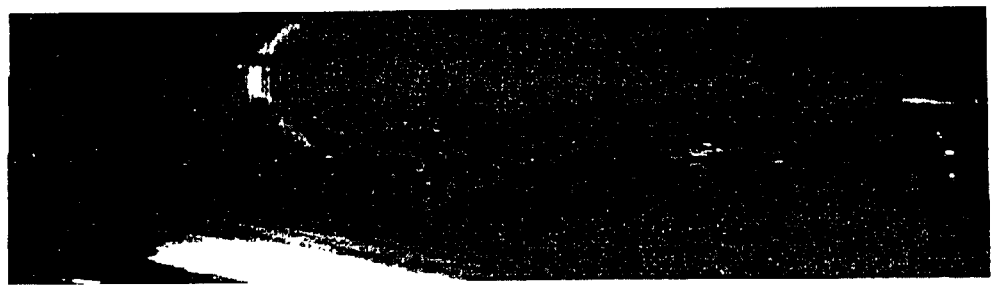
FIG. 12 shows the spray of atomized droplets of example 3 discharged from the atomizer.

FIG. 12 shows the spray of atomized droplets from this example discharged from the atomizer and FIG. 13 shows the enlarged droplets photographed in the reactor close to the free surface.

What is claimed is:

1. A process comprising pressure atomizing a non-Newtonian immiscible liquid at a gauge pressure from 3 to 100 bars through at least one atomizer having an opening diameter from 0.01 mm to 2 mm and a length less than 5 mm and an L/D ratio from 0.2 to 5 at a flow rate from 0.05 to 15 ml/second/per atomizer, wherein the flow of the liquid to be atomized is subjected to a pressure pulsation upstream of the atomizer inlet at a frequency of less than 200 Hz with an amplitude of less than 20% of the liquid static pressure upstream the atomizer, in an amount from 0.01 to 60% volume of a continuous liquid phase, below the free surface of the continuous liquid phase which may be stationary or flowing, contained in a tank, pipe or loop vessel, to produce a dispersion of atomized droplets of the immiscible liquid having at least one controlled average diameter from 0.1 mm to 5 mm.

2. The process according to claim 1, wherein the continuous phase is a liquid having a viscosity up to 150 cP.

3. The process according to claim 2, wherein the continuous phase further comprises from 0.1 to 10 weight % based on the weight of the continuous phase of one or more suspension stabilizers.

4. The process according to claim 3, wherein the liquid to be atomized further comprises from 0 to 10 weight % based on the weight of the liquid to be atomized of one or more members selected from the group consisting of initiators, anti-static agents, flame retardants, pigments, dyes, fillers, UV stabilizers, heat and light stabilizers, coating agents plasticizers, chain transfer agents, crosslinking agents, nucleating agents, insecticides and rodenticides.

5. The process according to claim 4, wherein the suspension stabilizer is polyvinyl alcohol having a molecular weight greater than 30,000, which has been hydrolyzed up to 98%.

6. A process according to claim 5, wherein pressure of the flowing liquid to be atomized may optionally be modulated upstream the atomizer inlet with a step-type amplitude at the constant frequency, by imposing upstream of the atomizer a pressure pulsation of an amplitude of less than 20% of the static pressure of the flowing liquid and at a frequency up to 500 Hz.

7. The process according to claim 6, wherein the liquid to be atomized is selected from the group consisting of one or more monomers which have been polymerized to from 5 to 45% and one or more monomers having dissolved therein from 5 to 45 weight % of a polymer soluble is such monomers.

8. The process according to claim 7, wherein the one or more monomers are selected from the group consisting of $C_{8-12}$ vinyl aromatic monomers which are unsubstituted or substituted by up to two substituents selected from the group consisting of $C_{1-4}$ alkyl radicals, acrylonitrile, methacrylonitrile, maleic anhydride, malimide, and $C_{1-4}$ alkyl esters of $C_{1-6}$ monocarboxylic acids.

9. The process according to claim 8, wherein the liquid to be atomized contains from 0 to 40 weight % of water.

10. The process according to claim 9, wherein the liquid to be atomized has a viscosity from 1 cP to 4000 cP.

11. The process according to claim 10, wherein to the liquid to be atomized is maintained at a temperature from 20° C. to less than its decomposition temperature at one or more locations selected from the group consisting of the storage tank for the liquid, the transfer from the storage tank to the atomizer, and the atomizer.

12. The process according to claim 11, wherein the continuous phase is water.

13. The process according to claim 12, wherein the polyvinyl alcohol is present in the continuous phase in an amount from 0.1 to 8 weight % based on the weight of the continuous phase and depending on the viscosity of the liquid to be atomized.

14. The process according to claim 13, wherein the temperature of the continuous phase is less than or equal to 95° C.

15. The process according to claim 14, wherein the temperature of the liquid to be atomized is less than or equal to 95° C.

16. The process according to claim 15, wherein said one or more monomers are selected from the group consisting of styrene, alpha methylstyrene, para methylstyrene, methyl methacrylate, ethyl methacrylate, butyl acrylate, methyl acrylate, ethyl acrylate and butyl acrylate.

17. The process according to claim 16, wherein the atomized liquid droplets have an average diameter from 0.3 to 3 mm and a standard deviation of the droplet size distribution is from 0.03 to 0.25 mm.

18. The process according to claim 17 wherein the atomizer has an exit orifice size from 0.1–0.8 mm, the flow rate through the atomizer is from 0.1 to 12 ml/s, the static pressure of the immiscible liquid upstream of the atomizer is from 3 to 80 bars.

19. The process according to claim 18, further comprising subjecting the atomized liquid to polymerization to not less than 75% conversion at a temperature up to 130° C.

20. The process according to claim 19, wherein said polymerization is conducted in the presence of from 2.5 to 7 weight % based on the weight of the atomized liquid of a blowing agent.

21. The process according to claim 20, wherein the polymerized particles of atomized liquid are impregnated with from 2.5 to 7 weight % of a blowing agent after polymerization.

22. The process according to claim 19, wherein the continuous phase further comprises one or more components selected from the group consisting of initiators, antistatic agents, flame retardants, pigments, dyes, fillers, UV stabilizers, heat and light stabilizers, coatings agents, plasticizers, chain transfer agents, crosslinking agents, nucleating agents, insecticides and rodenticides.

23. The process according to claim 20, wherein the continuous phase further comprises one or more components selected from the group consisting of initiators, anti-static agents, flame retardants, pigments, dyes, fillers, UV stabilizers, heat and light stabilizers, coatings agents, plasticizers, chain transfer agents, crosslinking agents, nucleating agents, insecticides and rodenticides.

24. The process according to claim 21, wherein the continuous phase further comprises one or more components selected from the group consisting of initiators, anti-static agents, flame retardants, pigments, dyes, fillers, UV stabilizers, heat and light stabilizers, coatings agents, plasticizers, chain transfer agents, crosslinking agents, nucleating agents, insecticides and rodenticides.

25. The process according to claim 19, wherein the liquid to be atomized further comprises one or more components selected from the group consisting of initiators, anti-static agents, flame retardants, pigments, dyes, fillers, UV stabilizers, heat and light stabilizers, coatings agents, plasticizers, chain transfer agents, crosslinking agents, nucleating agents, insecticides and rodenticides.

26. The process according to claim 20, wherein the liquid to be atomized further comprises one or more components selected from the group consisting of initiators, anti-static agents, flame retardants, pigments, dyes, fillers, UV stabilizers, heat and light stabilizers, coatings agents, plasticizers, chain transfer agents, crosslinking agents, nucleating agents, insecticides and rodenticides.

27. The process according to claim 21, wherein the liquid to be atomized further comprises one or more components selected from the group consisting of initiators, anti-static agents, flame retardants, pigments, dyes, fillers, UV stabilizers, heat and light stabilizers, coatings agents, plasticizers, chain transfer agents, crosslinking agents, nucleating agents, insecticides and rodenticides.

* * * * *